INVENTOR
PAUL W. GOLDEN

BY
Scrivener Parker Scrivener & Clarke
ATTORNEYS

PHOTOCOMPOSING APPARATUS INCLUDING FONT DELETION AND FONT CHANGE INTERLOCK MEANS

Filed Nov. 19, 1964 2 Sheets-Sheet 2

INVENTOR

PAUL W. GOLDEN

BY

*Scrivener Parker Scrivener & Clarke*

ATTORNEYS

United States Patent Office 3,258,201
Patented June 28, 1966

3,258,201
PHOTOCOMPOSING APPARATUS INCLUDING FONT DELETION AND FONT CHANGE INTERLOCK MEANS

Paul W. Golden, Colorado Springs, Colo., assignor to International Typographical Union of North America, Colorado Springs, Colo.

Filed Nov. 19, 1964, Ser. No. 412,533
14 Claims. (Cl. 234—5)

Figure 1:
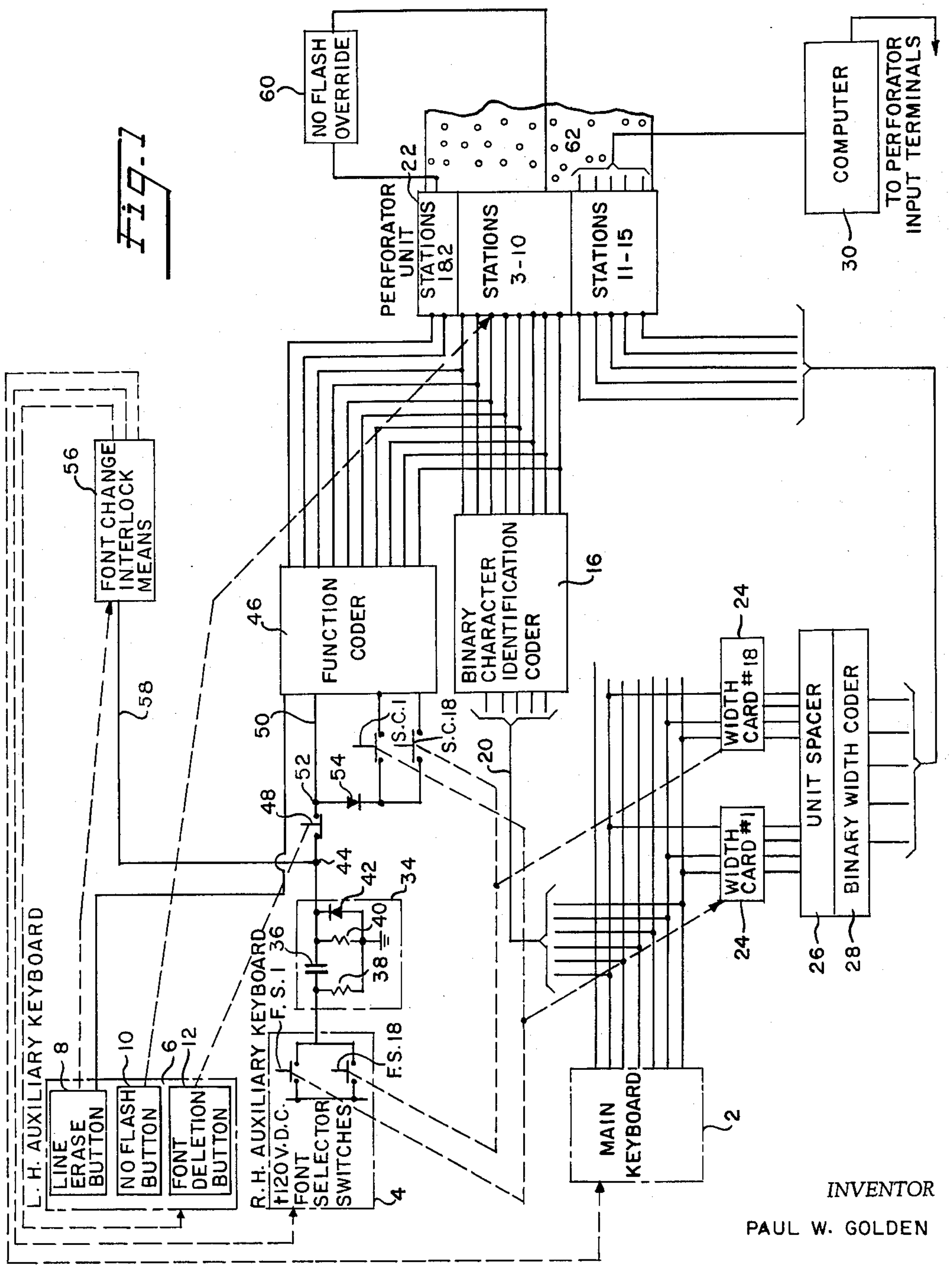

This invention relates generally to improved tape perforating apparatus for phototypographical machines, and more particularly to a tape perforating apparatus including font deletion means for permitting selection of a font width card without recording font selection codes on the perforated tape, and font change interlock means for automatically disabling the main and auxiliary keyboard panels in the event the operator "line erases" a line containing a font change code.

The apparatus of the present invention is adapted for use in keyboard machines of the type disclosed in the U.S. patents to Rossetto et al. No. 2,816,609, Robbins et al. No. 2,848,049 and Donahue et al. No. 3,056,545, wherein control tapes are produced containing coded lines of composed text material, including justification, quad right, or centering information that controls the photography of a line in the desired manner. The coded control tape may thereupon be used in photographic machines of the type disclosed in the U.S. patents to Corrado et al. No. 2,923,215 and Rossetto et al. No. 3,106,880 wherein the text material represented by the coded signals on the control tape is recorded on a sensitized film as latent images.

In my companion U.S. patent application Serial Number 386,136 filed July 30, 1964, and entitled, "Composing Apparatus for Phototypographical Machines," a keyboard-operated perforating apparatus is disclosed including "no-flash" switch means for disabling those perforator stations normally used in the coding of "character identification" information on the tape, whereby only "character width" information is recorded. Such a system is particularly suitable for use in the keyboarding of difficult text (for example, mathematical formulae, wherein the spacing distances between characters on one line are dependent upon the spacing distances between characters of a preceding or subsequent line). My prior system also includes override means responsive to the coding of "machine function" commands (i.e., "justification," "line erase," "font selection," etc.) for enabling the character identification perforator stations even though the "no-flash" button is actuated, whereby the recordation of machine function commands is permitted at all times.

One problem that occurs during the coding of "character width" information during the aforementioned "no-flash" condition is that quite often a font change is desired during the width coding of a "no-flash" line. Thus, for example, it may be desired to obtain width information on characters contained on different font plates during the coding of a single "no-flash" line. Ordinarily, it would be necessary to actuate a font change button on the auxiliary keyboard to enable a width card corresponding to the desired new font plate and to disable the original width card associated with the original font, which actuation would normally be accompanied by the recording on the control tape of a "font change" command. In fact, eight to ten font changes might well be required to obtain the necessary width information for a no-flash line. These font change commands would normally result in unnecessary, time-consuming font plate changes at the photographic unit. Since only width information is desired (i.e., since no characters are to be photographed on the film at this time), the changing of the font plates at the photographic unit is superfluous and should preferably be avoided.

Accordingly, a primary object of the present invention is to provide a photocomposing machine of the type described including font deletion means for obtaining character width information from a selected one of the width cards associated with the various font plates, respectively, without the recordation of "font change" commands on the tape. More particularly, a font deletion key is provided on the auxiliary keyboard means for opening a switch arranged between the font selector switches and the common and specific code inputs to the function coding unit of the tape perforating unit. Consequently, the function coder is isolated from the font selector switches. However, these font selector switches are operable to enable the corresponding width cards in a manner similar to the teaching presented by the U.S. Patent to Corrado et al. No. 3,061,182.

Another problem resulting from the use of the known photocomposing machines is the difficulty in maintaining a desired font when a line containing a font change command is "line erased." In the known systems, the keyboard remains enabled if a line containing a font change instruction is "line erased," with the result that the subsequent lines are photographed in the font previously selected by the photographic unit. Since the coding unit is in the wrong font, not only is the wrong type face set at the photographic unit, but also the wrong width card is enabled, whereby incorrect character width information is inserted into the computer.

Accordingly, another object of the invention is to provide font change interlock means for locking out the main typewriter keyboard and the auxliary keyboard units in the event that the operator "line erases" a line containing a font change code. In accordance with the present invention, in the event that a font change code is "line erased," the operator must depress the font selection key, again inserting the font code in the control tape, before the keyboard is enabled and tape coding can continue. The system is so designed, however, that any subsequent line not containing a font code may be erased without disabling the machine. To this end, font selection signals appearing intermediate the font selection switches and the aforementioned font deletion switch are applied to the control grid of the thyratron of font change interlock means. A one-line memory font code coil connected in the anode circuit of this thyratron controls a switch connected in parallel with line erase switches in the circuit of the right-hand auxiliary keyboard interlock solenoid. These interlock means in turn mechanically enable a switch that is responsive to the operation of the font selector switches and that controls the energization of the typewriter and left-hand auxiliary keyboard interlock means. Consequently, operation of "line erase" button to erase a font change line automatically disables the main and auxiliary keyboards of the photocomposing machine.

Figure 2:
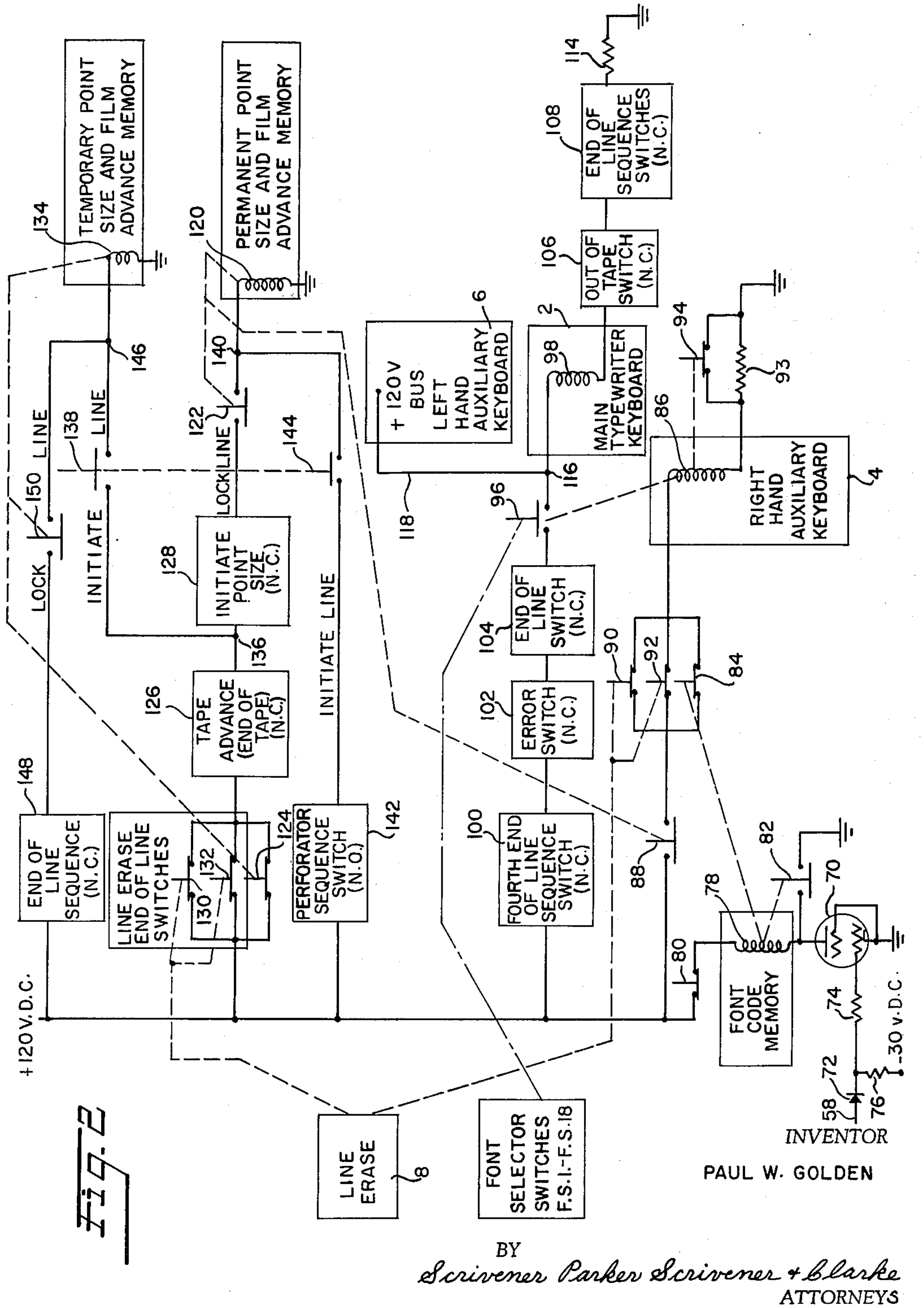

Other objects and advantages of the invention will become apparent from a study of the following specification when considered in conjunction with the accompanying drawing, in which:

FIGURE 1 is a block diagram of the tape coding system of the present invention; and FIGURE 2 is an electrical schematic diagram of the font change interlock means of FIGURE 1.

Referring to FIGURE 1, the tape coding unit includes a main typewriter keyboard 2 and right and left-hand auxiliary keyboards 4 and 6 as generally disclosed in the U.S. patent to Donahue et al. No. 3,056,545 of October 2, 1962. The main keyboard 2 comprises a modified standard electric typewriter of the type disclosed in the U.S. patent to Robbins et al. No. 2,848,049 of August 19, 1958. Thus, in addition to effecting a typing operation, each of the finger keys of the main keyboard also engages an electric contact to complete circuits for the coding of "character identification" and "character width" information on the ontrol tape. The left-hand auxiliary keyboard 6 contains controls to effect such conventional operations as quad right, quad left, centering, justification and line erase end of composition instructions and the like. More specifically, the left-hand auxiliary keyboard includes a conventional "line erase" button 8, and in accordance with the teaching presented in my aforementioned U.S. patent application Serial Number 386,136, a "no-flash" button 10.

According to the present invention, the auxiliary keyboard 6 also includes a font deletion button 12 the operation of which will be described in greater detail below.

The right-hand auxiliary beyboard 4 is conventional and includes eighteen font selection switches F.S. 1 through F.S. 18, respectively, by means of which the tape is coded to effect selection of a corresponding one of eighteen type fonts at the tape read-out unit. For the sake of clarity, only two of the eighteen font selection switches have been illustrated in FIGURE 1.

As disclosed in the aforementioned Donahue et al. patent, operation of a character key on the main keyboard 2 causes signals to be applied to the input of the binary character identification coder 16 via conductors 20. The eight output terminals of the character identification coder 16 are connected with the input terminals of stations 3–10, respectively, of the fifteen station perforator unit 22.

The signals appearing on the main keyboard conductors are also applied to the input terminals of eighteen width cards 24 as disclosed in the U.S. patent to Corrado et al. No. 3,061,182 of October 3, 1962. Only the first and eighteenth width cards have been illustrated in FIGURE 1. These width cards are selectively enabled by operation of the corresponding font selector switches F.S. 1–F.S. 18, respectively, by contact switching as taught in the aforementioned Corrado et al. patent.

Signals passing through a given enabled width card 24 are applied, via the unit spacer 26, to the binary width coder 28, the five outputs of which are applied to the input terminals of stations 11–15 of the perforator unit 22. As disclosed in my aforementioned U.S. patent application Serial Number 386,136, the outputs appearing at the cathode resistors of the thyratrons at perforator stations 11–15 are applied to the computer 30. The computer 30 is of the electronic type disclosed in the Donahue et al. Patent No. 3,056,545.

The font selector switches F.S. 1–F.S. 18, are connected in parallel with the input terminal of a pulse forming network 34 including a capacitor 36, resistors 38 and 40, and a diode 42 that serves as a negative clamp. The output terminal 44 of the pulse forming network 34 is connected with the function coder unit 46 via font delete switch 48 and common code conductor 50. Connected at one side at junction 52 with common code conductor 50 via blocking diode 54 are eighteen specific code switches S.C. 1–S.C. 18 that are operated by the font selector switches F.S. 1–F.S. 18, respectively. The ten output terminals of the function coder 46 are connected with the input terminals of perforator stations 1–10.

In accordance with the present invention, signals appearing at junction 44 intermediate the output terminal of pulse forming network 34 and the font deletion switch 48 are applied to the input terminal of font change interlock means 56 via conductor 58. The font change interlock means 56 is operable to disable (i.e., "lock out") the main and auxiliary keyboards 2, 4 and 6 when the "line erase" button is operated to erase a font change command as will be described in greater detail below.

As disclosed in my aforementioned patent application Serial Number 386,136, no-flash override means 60 are provided for enabling stations 3–10 upon output of machine function signals to stations 1 and 2. The perforator unit is operable to punch "character identification," "character width," and "machine function" information on the control tape 62.

Referring now to FIGURE 2, the font change interlock means includes a thyratron 70 the control grid of which is connected with conductor 58 via diode 72 and grid resistor 74. The control grid of thyratron 70 is biased by grid resistor 76, and the screen grid and cathode are connected with ground. The anode of thyratron 70 is connected with the positive D.C. supply via font code memory coil 78 and the normally-closed end of line switch 80 that is opened at the end of each line. Coil 78 controls the operation of normally-open locking switch 82 connected in a grounded self-locking circuit in parallel with thyratron 70, and a normally-closed switch 84 associated with the right-hand auxiliary keyboard interlock solenoid 86.

The right-hand auxiliary keyboard interlock solenoid 86 is connected at one end with the positive D.C. supply via switch 84 and the permanent point size and film advance switch 88. A first pair of switches 90 and 92 operated by the "line erase" button 8 are connected in parallel with switch 84 as shown. The other end of solenoid 86 is connected with ground via current limiting resistor 93 across which is shunted a switch 94 operated by solenoid 86. Solenoid 86 holds the selected font switch in the operated condition (by means of conventional bail means). Switch 96, which comprises one section of the font selector switch means, is associated with the typewriter interlock solenoid 98. More specifically, by the use of solenoid-operated bail means, switch 96 is enabled for operation by any of the font selector switches F.S. 1–F.S. 18 only when solenoid 86 is energized.

At one end, the typewriter interlock solenoid 98 is connected with the positive D.C. supply via end-of-line sequence switch 100, error switch 102, end of line switch 104 and switch 96. The other end of the typewriter interlock solenoid 98 is connected with ground via out of tape switch 106, three end-of-line sequence switches 108, and current limiting resistor 114. The interlock solenoids 86 and 98 operate conventional mechanical means that disable the respective keyboard panels.

The aforementioned switch 88 is operated by the permanent point size and film advance memory coil 120 which is connected at one end with ground. The other end of coil 120 is connected with the positive D.C. supply via temporary point size and film advance (one-line memory) switch 124, tape advance switch 126, point size initiation switch 128, and a switch 122 that is also operated by coil 120. A second pair of switches 130, 132 which operate during a "line-erase" end-of-line sequence, are connected in parallel with switch 124.

The temporary point size and film advance memory coil 134, which controls the operation of switch 124, is connected at one end with ground and at the other end with junction 136 between switches 126 and 128 via first film advance initiation switch 138. Junction 140 between switch 122 and coil 120 is connected with the positive D.C. battery supply via sequence switch 142 (that is operated by conventional cam means of the perforator) and a second film advance initiation switch 144 (that operates in conjunction with switch 138). Junction 146 between switch 138 and coil 134 is connected with the positive D.C. supply via end-of-line sequence switch 148, and locking switch 150 that is also operable by coil 134. The various switches of FIGURE 2 are normally in their illustrated closed and open conditions, respectively.

*Operation*

Assume that the operator desires to code on the tape text material that is to be photographed at the read-unit in characters of a given font (for example, Font No. 1).

The operator activates font switch F.S 1 on the right-hand auxiliary keyboard 4, whereupon the corresponding width card 24 (width card No. 1) is enabled (as disclosed in the Corrado et al. Patent No. 3,061,182) and the corresponding specific code switch S.C. 1 is closed. Closing of the font selector switch F.S. 1 causes a positive-going pulse to be generated by the pulse forming network 34 that passes through the normally-closed font deletion switch 48 and is applied as a common code signal to the function coder 46 via common code conductor 50. The common code input causes function coder 46 to generate signals on the appropriate leads to the perforator stations (for example, stations 1, 3 and 4) that identify the command function as being a "font selection" command. Simultaneously, a specific code signal passes from junction 52 through diode 54 and specific code switch S.C. 1, and is coded in binary form by function coder 46 to effect operation of predetermined ones of the perforator stations 6–10 to properly identify the specific font selected at the right-hand auxiliary keyboard. The positive-going pulse appearing at junction 44 is applied to font change interlock 56 via conductor 58 as will be described in greater detail below.

Upon operation of the typewriter keys on main keyboard 2, signals are applied via the corresponding conductors to the binary character identification coder 16 that effects firing of the perforator thyratrons at appropriate ones of the stations 3–10 of the perforator unit 22. Consequently, character identification information is punched on the tape 62 at appropriate ones of the perforator stations 3–10. Simultaneously, corresponding signals are applied to the unit spacer 26 via that width card 24 which is enabled at a given time (specifically, Width Card No. 1). The width information is coded in binary form by the binary coder 28 and is applied to the appropriate input terminals of stations 11–15 of the perforator unit. Consequently, stations 11–15 effect punching of the appropriate width information on the perforated tape 62. Pulses from the cathode resistors of the appropriate thyratrons of stations 11–15 are applied to the complementary computer 30.

Assume now that as disclosed in my aforementioned U.S. patent application Serial Number 386,136, the "no-flash" button 10 is actuated to disable perforator stations 3–10, whereby only width information for the respective characters typed on the main keyboard 2 is recorded on the tape by perforator stations 11–15. This "no-flash" operation of the machine is desirable, for example, during the keyboarding of mathematical formulae, wherein the spacing of the characters of one line is dependent upon the spacing of the characters of a preceding or subsequent line. This character width information is, of course, dependent upon the font that has been previously selected (i.e., the width information provided by the enabled Width Card No. 1).

Assume that during the keyboarding of width information of a given line under "no-flash" conditions, a font change is desired. More specifically, assume that it is desired to code the width of a character contained only on Font Plate No. 18. However, since the operator does not wish to code "font change" commands onto the tape at this time, the operator presses font deletion button 12 to open switch 48 prior to actuation of the font selection switch F.S. 18. When font switch F.S. 18 is actuated with font deletion switch 48 in the open condition, the pulse generated by the pulse forming circuit 34 is applied only to font change interlock means 56 via 58. Since switch 48 is open to isolate function coder 46, no common or specific code signals are applied to the input of the function coder, and consequently no font change commands are recorded on the tape. This is desirable for two reasons. First, at the read-out unit, since corresponding movement of the Font Plate No. 18 is not called for, unnecessary time-consuming font changing operations are avoided. Secondly, since machine function signals applied by function coder 46 to perforator stations 1 and 2 would ordinarily cause enabling of the stations 3–10 by the no-flash override means 60 even though the system is in the "no-flash" condition (as disclosed in my aforementioned prior U.S. patent application), the provision of the font deletion switch 48 positively prevents inadvertent operation of the no-flash override means 60 and attendant enabling of stations 3–10 during "no-flash." Consequently, upon operation of the desired typewriter key, corresponding signals are applied to the enabled Width Card No. 18, whereupon corresponding width information is recorded on tape 62 at stations 11–15. Since stations 3–10 are disabled by the "no-flash" button, no character identification information is recorded during "no-flash" operation.

Upon release of the "no-flash" key, operation of the typewriter keys again causes "character identification" and "character width" information to be coded on the tape 62.

As indicated above, each time a font selection switch (F.S. 1–F.S. 18) is operated, a pulse is applied from the pulse forming network 34 to the font change interlock means 56 via conductor 58 regardless of whether or not the "font delete" and/or "no-flash" buttons have been operated. More particularly, assume that the film advance initiation switches 138 and 144 are initially closed, whereby lock switches 150 and 122 and switch 88 are closed and switch 124 is opened. The pulse applied to the control grid of thyratron 70 via conductor 58 causes the thyratron to fire, whereupon coil 78 is energized, switch 84 is opened, and switch 82 is closed to squelch thyratron 70 and to lock memory coil 78 to ground. The right-hand interlock solenoid 86 is energized via switches 90 and 92, the right-hand auxiliary keyboard 4 and the bail controlled switch 96 are enabled, and owing to the operation of the font selection switch, switch 96 is closed. Consequently, interlock solenoid 98 is energized, and the main and left-hand auxiliary keyboards are enabled.

Assume now that during the coding of a line a mistake has been made and the operator actuates the line erase button 8. In accordance with the invention, if the coded line to be erased is a "font change" command, the typewriter and auxiliary keyboards are locked out, whereupon prior to the resumption of keyboarding, it is necessary for the operator to again actuate one of the font selector buttons. More specifically, since the coding of a font change results in the one-line memory coil 78 being locked to ground by switch 82, and switch 84 being locked in the open condition, the subsequent operation of line erase button 8 causes switches 90 and 92 to open, whereupon solenoid 86 is de-energized and the right-hand auxiliary keyboard is disabled. Switch 96 is opened upon de-energization of right-hand solenoid 86, whereupon solenoid 98 is de-energized and the typewriter and left-hand auxiliary keyboards are also disabled.

Similarly, the circuitry associated with coil 134 causes the permanent point size and film advance memory to be locked out in the event the operator ends an erroneously coded line as a "line-erase" end-of-line. Thus, when point size and film advance initiation switches 138 and 144 are closed to effect closing of locking switches 150 and 122 and switch 88 and opening of one-line memory switch 124, opening of the line-erase end of line switches 130 and 132 causes de-energization of coil 120, whereby switches 122 and 88 are opened. Solenoid 86 is de-energized to disable the right-hand auxiliary keyboard, and switch 96 is opened to disable the main and left-hand auxiliary keyboard. It is apparent that line-erasing of a line in which point size and film advance has been recorded into the tape causes the typewriter and auxiliary keyboard panels to be disabled, as the function instructions to the photographic unit have been "killed." Therefore, if one line-erases a recorded line, switches 130 and 132 open at the start of this "line-erase" end-of-line sequence. Switch 124 is held open by the one-line memory coil 134, and coil 120 drops out. Switch 148 drops coil 134 during this same sequence.

Following line erase, to restore the machine for operation, the operator must again actuate one of the font-selection switches F.S. 1–F.S. 18, whereupon a pulse is transmitted in the interlock means 56 via conductor 58, switches 84 and 96 are closed, and the typewriter and auxiliary keyboards are again enabled as described above.

It is important to note that as distinguished from prior systems wherein full coding (i.e., point size, film advance and font change) is required to restore to operation a machine that has been locked out, in accordance with the present invention, only operation of one of the font selection buttons is required in the event that a line containing a font change is erased. Since memory coil 78 constitutes a one-line memory, any subsequent line not containing a font code may be erased without disabling the machine. More specifically, switch 84 remains closed during the coding of lines where there has been no font change. Consequently, when the line erase button is operated at the end of the coding of a line in which there has been no font change, switch 84 remains closed and the opening of switches 90 and 92 does not de-energize solenoid 86. Since switch 80 is automatically opened at the end of each line, the closing of switch 84 at the end of each line is assured.

The mechanical details of the solenoid-actuated typewriter and auxiliary keyboard interlock means are conventional in the art and have not been illustrated in the drawings. It suffices to say that the basic typewriter keyboard interlock employs a mechanical roller race which functions to prevent the depression of more than one key at any one time. This interlock will function every time a character key or the space bar is depressed. The interlock solenoid 98 is mechanically linked to the key lever locking bar which operates every time solenoid 98 is energized.

While in accordance with the provisions of the patent statutes the preferred form of the invention has been illustrated and described, it will be apparent to those skilled in the art that various changes and modifications may be made in the apparatus described without deviating from the invention set forth in the following claims.

What is claimed is:

1. Composing apparatus for preparing a perforated tape for use in the read-out unit of a phototypographical machine, comprising
   multi-station tape perforating means;
   means including main typewriter keyboard means and character identification coder means for operating a first group of said perforator stations to code "character identification" information on the tape;
   means including said main typewriter keyboard means, width card means, and width coder means for operating a second group of said perforator stations to code "character width" information on the tape, said width card means including a plurality of normally disabled width cards containing width information corresponding with the characters of the various fonts at the read-out unit, respectively;
   means including auxiliary keyboard means and function coder means for operating said perforator means to code "font change" instructions on the tape, said auxiliary keyboard means including a plurality of font selector switches associated with an operable to enable said width cards, respectively; and
   font code deletion means for isolating said function coder means from said font selector switch means, whereby operation of one of said font selector switch means effects enablement of the corresponding width card without recordation of a corresponding "font change" code on the tape.

2. Apparatus as defined in claim 1 wherein said auxiliary keyboard means includes "line erase" means for coding a "line erase" command on the tape; and
   font change interlock means responsive to the operation of said font selector switch means and said "line erase" means for disabling said main and auxiliary keyboard means when the information erased by said "line erase" means includes a "font change" instruction code.

3. Apparatus as defined in claim 2 and further wherein said auxiliary keyboard means includes "no-flash" means for disabling said second group of perforator stations, whereby operation of said main keyboard means causes only width information to be coded on the tape.

4. Composing apparatus for preparing perforated tape for use in the read-out unit of a phototypographical machine, comprising
   multi-station tape perforating means;
   means including main typewriter keyboard means for operating said perforating means to code "character width" and "character identification" information on the tape;
   means including auxiliary keyboard means for operating said perforating means to code "machine function" commands on the tape, said auxiliary keyboard means including a plurality of font selector switches each of which is operable to effect coding of a different "font change" command on the tape, and "line erase" means for coding a "line erase" command on the tape; and
   solenoid-operated keyboard interlock means responsive to the operation of said "line erase" means and said font selector switch means for disabling said main and auxiliary keyboard means when said "line erase" means is operated to erase a line containing a "font change" command.

5. Composing apparatus for preparing a perforated tape for use in the read-out unit of a phototypographical machine comprising
   multi-station tape perforating means;
   means including main typewriter keyboard means and character identification coder means for operating a first group of said perforator stations to code "character identification" information on the tape;
   means including said main typewriter keyboard, width card means and width coder means for operating a second group of said perforator stations to code "character width" information on the tape, said width card means including a plurality of normally disabled width cards containing width information corresponding with the characters of the various fonts, respectively;
   means for operating said perforator means to code "machine function" commands on the tape, comprising auxiliary keyboard means including a plurality of normally-open font selector switches, pulse forming means for generating a pulse upon the closing of any of said font selector switches, means including common code conductor means and function coder means connected with said pulse forming means for recording a "font change" common code on the tape, means including a plurality of specific code switches and said function coder for recording a specific "font change" code on the tape corresponding with that one of said font selector switches that is operated at a given time, said specific code switches being associated with said font selector switches, respectively, each of said font selector switches being operable to close the corresponding specific code switch and to enable the corresponding width card; and
   normally-closed font deletion switch means operable to isolate the function coder means from said pulse forming means, whereby closing of a font selector switch with the font deletion switch means in the open condition causes enablement of the corresponding width card without recordation of a font change command on the tape.

6. Apparatus as defined in claim 5, wherein said auxiliary keyboard means includes "line erase" means operable in conjunction with said function coder to code a "line erase" command on the tape; and font change interlock means responsive to the operation of said "line erase" means and any of said font selector switch means for disabling said main and auxiliary keyboard means when said "line erase" means is operated to erase a line containing a "font change" command, said font change interlock means including an input terminal, and conductor means continuously connecting said input terminal with the output terminal of said pulse forming means.

7. Composing apparatus for preparing a perforated tape for use in the read-out unit of a phototypographical machine, comprising multi-station tape perforating means;

means including main typewriter keyboard means for operating said perforating means to code "character width" and "character identification" information on the tape;

means including first auxiliary keyboard means having a plurality of font selector switches for operating said perforating means to code "font change" commands on the tape;

means including second auxiliary keyboard means for operating said perforating means to code a "line erase" command on the tape; and solenoid-operated interlock means responsive to the operation of said "line erase" means and said font selector switch means for disabling said main, first auxiliary and second auxiliary keyboard means when said "line erase" means is operated to erase a line containing a "font change" command.

8. Apparatus as defined in claim 7 wherein said solenoid-operated interlock means comprises first, second and third interlock solenoid means associated with said first and second auxiliary and said main keyboard means, respectively, each of said interlock solenoid means being energizable and de-energizable to enable and disable the associated keyboard means, respectively.

9. Apparatus as defined in claim 8, and further including means for energizing said first auxiliary keyboard interlock solenoid means comprising a voltage source;

circuit means including a first normally-closed switch for connecting said first interlock solenoid means in series with said source;

a normally-closed second switch connected in parallel with said first switch;

means responsive to the operation of any of said font selector switches for opening said first switch; and means responsive to the operation of said "line erase" means for opening said second switch, whereby said first interlock solenoid is de-energized only when both of said first and second switches are open.

10. Apparatus as defined in claim 9 wherein said means for opening said first switch includes font code memory means operable in response to activation of any of said font selector switch means for maintaining said first switch in the open condition during the coding of a line of text, and means responsive to the end of the coding of a line for interrupting the operation of said font code memory means.

11. Apparatus as defined in claim 10 wherein said font code memory means comprises a thyratron having a pair of power circuit electrodes and a control grid, a font code memory solenoid for operating said first switch, a voltage source means including an end-of-line switch for connecting said power circuit electrodes in series with said end-of-line switch and said voltage source, and means connected with said control grid for firing said thyratron in response to the activation of any of said font selector switch means.

12. Apparatus as defined in claim 11 and further including self-locking switch means operable by said font code memory solenoid for establishing a self-locking path for said memory solenoid in parallel with said thyratron.

13. Apparatus as defined in claim 12 and further including means including normally-disabled normally-open switch means operable by any of said font selector switches for energizing said second and third interlock solenoids, said normally disabled switch means being enabled by energization of said first interlock solenoid.

14. Composing apparatus for preparing a perforated tape for use in the read-out unit of a phototypographical machine, comprising multi-station tape perforating means;

means including main typewriter keyboard means for operating said perforating means to code "character width" and "character identification" information on the tape;

means including auxiliary keyboard means for coding "font change" and "point size" commands on the tape, and line erase means for erasing erroneously coded lines; and interlock means responsive to the operation of said line erase means for disabling said main and auxiliary keyboard means when said line erase means is operated to erase lines containing "point size" information.

No references cited.

WILLIAM S. LAWSON, *Primary Examiner.*